United States Patent
Nee et al.

(10) Patent No.: US 10,924,410 B1
(45) Date of Patent: Feb. 16, 2021

(54) TRAFFIC DISTRIBUTION MAPPING IN A SERVICE-ORIENTED SYSTEM

(71) Applicant: Amazon Technologies, Inc., Seattle, WA (US)

(72) Inventors: Darin Nee, Marin, CA (US); Anton Goldberg, San Jose, CA (US); Sergei Rutenberg, San Carlos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 16/140,424

(22) Filed: Sep. 24, 2018

(51) Int. Cl.
*H04L 12/803* (2013.01)
*H04L 12/24* (2006.01)
*G06Q 10/04* (2012.01)
*H04L 29/02* (2006.01)

(52) U.S. Cl.
CPC .......... *H04L 47/125* (2013.01); *G06Q 10/04* (2013.01); *H04L 29/02* (2013.01); *H04L 41/0668* (2013.01); *H04L 41/145* (2013.01)

(58) Field of Classification Search
CPC ... H04L 47/125; H04L 29/02; H04L 41/0668; H04L 41/145; G06Q 10/04
USPC ...................................................... 709/224
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,877,035 B2 | 4/2005 | Shahabuddin et al. | |
| 7,023,979 B1 | 4/2006 | Wu et al. | |
| 7,054,943 B1 | 5/2006 | Goldszmidt et al. | |
| 7,209,548 B2 | 4/2007 | Ethier et al. | |
| 7,372,952 B1 | 5/2008 | Wu et al. | |
| 7,388,839 B2 | 6/2008 | Chafle et al. | |
| 7,496,799 B2 | 2/2009 | Prang et al. | |
| 7,594,006 B2 | 9/2009 | Rolia et al. | |

(Continued)

FOREIGN PATENT DOCUMENTS

| | | |
|---|---|---|
| EP | 1372073 | 12/2003 |
| WO | 2013147660 | 10/2013 |

OTHER PUBLICATIONS

U.S. Appl. No. 14/491,438, filed Sep. 19, 2014, Harsha Ramalingam et al.

(Continued)

*Primary Examiner* — Kevin T Bates
*Assistant Examiner* — Chen-Liang Huang
(74) *Attorney, Agent, or Firm* — Robert C. Kowert; Kowert, Hood, Munyon, Rankin & Goetzel, P.C.

(57) ABSTRACT

Methods, systems, and computer-readable media for traffic distribution mapping in a service-oriented system are disclosed. A plurality of call paths are determined representing service interactions among a plurality of services. The call paths include a particular service and are determined using trace data generated by the services. Total call volumes are determined at individual ones of the services. Based at least in part on the call paths and the total call volumes, one or more estimated call ratios are determined between the particular service and one or more APIs of one or more additional services. Based at least in part on the call ratio(s) and the total call volumes, one or more call volumes are determined between the particular service and the one or more APIs of the one or more additional services.

20 Claims, 12 Drawing Sheets

(56) References Cited

U.S. PATENT DOCUMENTS

| | | |
|---|---|---|
| 7,676,034 B1 | 3/2010 | Wu et al. |
| 7,707,015 B2 | 4/2010 | Lubrecht et al. |
| 8,140,371 B2 | 3/2012 | Franz et al. |
| 8,204,981 B1 | 6/2012 | Mishra |
| 8,219,368 B1 | 7/2012 | Akella et al. |
| 8,260,649 B2 | 9/2012 | Ramanujan et al. |
| 8,300,798 B1 | 10/2012 | Wu et al. |
| 8,396,204 B2 | 3/2013 | Guerrero et al. |
| 8,612,180 B2 | 12/2013 | Yan et al. |
| 8,654,629 B1 | 2/2014 | Craig et al. |
| 8,909,567 B2 | 12/2014 | Kang et al. |
| 9,450,849 B1 | 9/2016 | Goldberg et al. |
| 9,559,928 B1 | 1/2017 | Porter et al. |
| 9,626,275 B1 | 4/2017 | Hitchcock et al. |
| 9,634,920 B1 | 4/2017 | Goldberg et al. |
| 9,684,524 B1* | 6/2017 | Porter ............ G06F 11/3452 |
| 9,928,517 B1* | 3/2018 | Hitchcock .......... G06Q 30/0201 |
| 2003/0093527 A1 | 5/2003 | Rolia |
| 2003/0154112 A1 | 8/2003 | Neiman et al. |
| 2004/0138936 A1 | 7/2004 | Johnson et al. |
| 2004/0226015 A1 | 11/2004 | Leonard et al. |
| 2005/0005012 A1 | 1/2005 | Odhner et al. |
| 2005/0138111 A1 | 6/2005 | Aton et al. |
| 2005/0276388 A1 | 12/2005 | Ethier et al. |
| 2006/0090163 A1 | 4/2006 | Karisson et al. |
| 2007/0025528 A1* | 2/2007 | Knott ............ H04M 3/10 379/32.01 |
| 2007/0118414 A1* | 5/2007 | Asaki ............ G06F 9/505 709/238 |
| 2008/0172275 A1 | 7/2008 | Ramanujan et al. |
| 2008/0271038 A1 | 10/2008 | Rolia et al. |
| 2008/0271039 A1 | 10/2008 | Rolia et al. |
| 2009/0290700 A1 | 11/2009 | Omiya |
| 2010/0088205 A1 | 4/2010 | Robertson |
| 2010/0088663 A1 | 4/2010 | Hammer et al. |
| 2011/0255675 A1 | 10/2011 | Jasper et al. |
| 2012/0087486 A1 | 4/2012 | Guerrero et al. |
| 2012/0144008 A1 | 6/2012 | Yuyitung et al. |
| 2012/0324092 A1 | 12/2012 | Brown et al. |
| 2012/0330711 A1 | 12/2012 | Jain et al. |
| 2013/0156557 A1 | 6/2013 | Green et al. |
| 2014/0046639 A1 | 2/2014 | Ricketts |
| 2014/0181267 A1 | 6/2014 | Wadkins et al. |

OTHER PUBLICATIONS

Rodrigo Fonseca, et al., "X-Trace: A Pervasive Network Tracing Framework", 4th USENIX Symposium of Networked Systems Design & Implementation (NSDI'07), Apr. 2007, pp. 1-14.

Behamin H. Sigelman, et al., "Dapper a Large-Scale Distributed Systems Tracing Infrastructure", Google Technical Report dapper-2010-1, Apr. 2010, pp. 1-14.

U.S. Appl. No. 14/491,762, filed Sep. 19, 2014, Ayan Roy Sarkar.

Jogalekar, et al, "Evaluating the scalability of distributed systems", IEEE Transactions on parallel and distributed systems 11.6, 2000, pp. 589-603.

Appleby, et al., "Using automatically derived load thresholds to manage compute resources on-demand", Integrated Network Management, 2005, IM 2005, 2005 9th IFIP/IEEE International Symposium, Pages.

* cited by examiner

TRAFFIC DISTRIBUTION MAPPING IN A SERVICE-ORIENTED SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogues of items offered for sale. For each item, such electronic catalogues typically include at least one product detail page that specifies various information about the item, such as a description of the item, one or more pictures of the item, as well as specifications (e.g., weight, dimensions, capabilities) of the item. In various cases, such stores may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Figure 1:
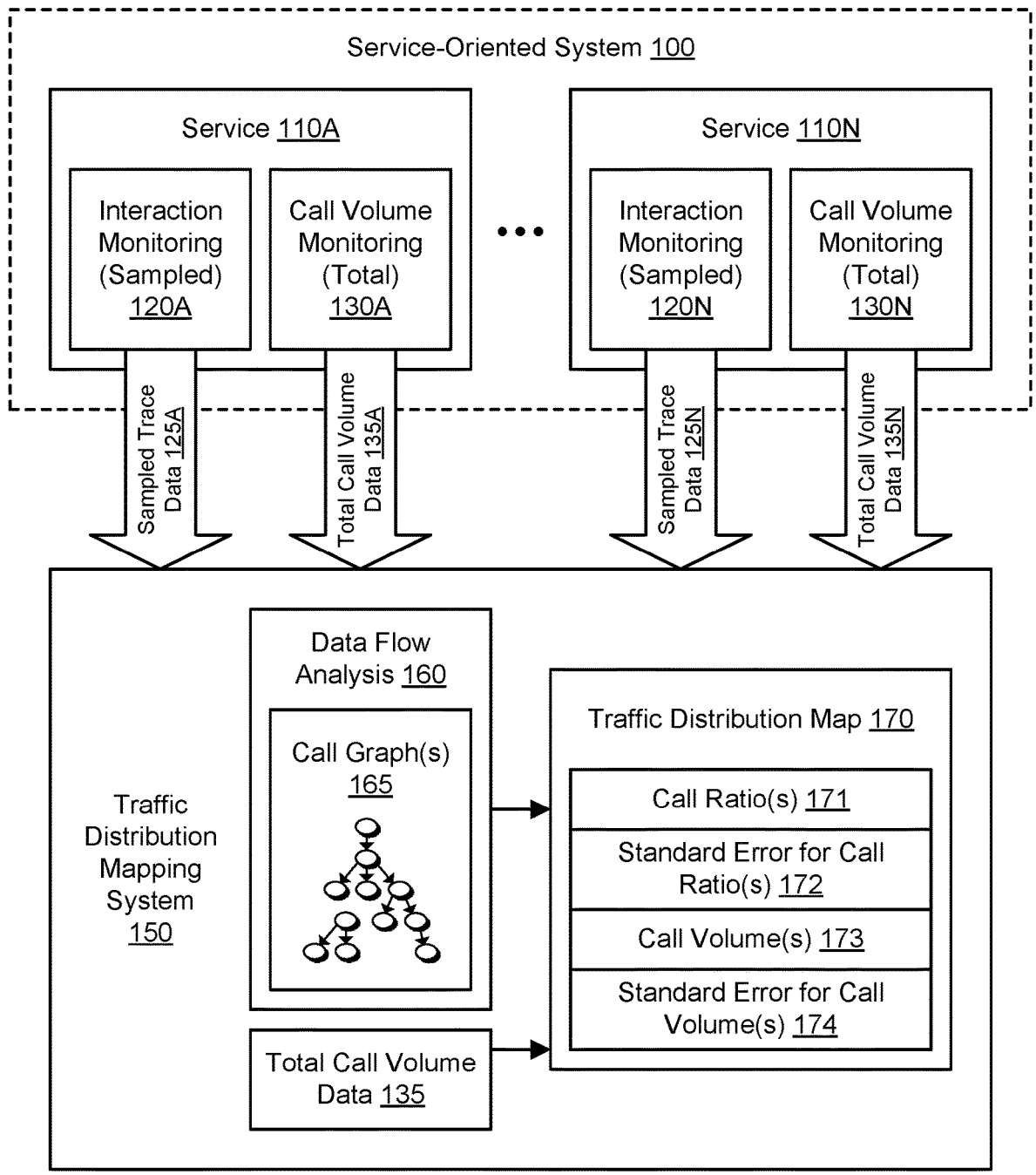
FIG. 1 illustrates an example system environment for traffic distribution mapping in a service-oriented system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for traffic distribution mapping in a service-oriented system are described. In one embodiment, a service-oriented system includes a set of services that interact via service requests to collaborate and perform tasks. In one embodiment, a traffic distribution mapping system may use a dependency graph of service interactions along with service-level call volume data to determine information representing a traffic distribution map. The dependency graph may be generated by tracing a sample of requests through the service-oriented system. The call volume data may be reported periodically by individual services and may represent the total call volume (i.e., not a sample) at those services over a period of time. Using these two sources of data, the mapping system may determine, for a particular service or application programming interface (API) over a particular period of time, an estimated dependency call ratio for the service or API, the standard error of the estimated dependency call ratio, an estimated source-attributed call volume for the service or API, and/or the standard error of the estimated source-attributed call volume. In one embodiment, the call ratio(s), call volume(s), and/or standard errors may be determined for unique call paths found in the trace data obtained from the service-oriented system. In one embodiment, the call ratio(s), call volume(s), and/or standard errors may be determined for upstream services relative to a particular service. In one embodiment, the call ratio(s), call volume(s), and/or standard errors may be determined for downstream services relative to a particular service. The traffic distribution map may be used for a variety of purposes, such as scaling of service instances, root cause analysis of performance problems, blast radius analysis of service outages, cost attribution for the use of services to other services, and so on.

As one skilled in the art will appreciate in light of this disclosure, embodiments may be capable of achieving certain technical advantages, including some or all of the following: (1) improving the accuracy of traffic distribution information in a set of services that implement a service-oriented architecture; (2) reducing the incidence of idle computing resources by appropriately downscaling service nodes based on accurate traffic distribution mapping; (3) improving the availability of services by appropriately upscaling service nodes based on accurate traffic distribution mapping; (4) improving the speed and accuracy of root cause analysis of performance problems in a service-oriented system based on accurate traffic distribution mapping; (5) improving the speed and accuracy of blast radius analysis of service outages in a service-oriented system based on accurate traffic distribution mapping; and so on.

FIG. 1 illustrates an example system environment for traffic distribution mapping in a service-oriented system, according to some embodiments. The example system environment may include a service-oriented system 100 and a traffic distribution mapping system 150. The service-oriented system 100 may implement a service-oriented architecture and may include multiple services 110A-110N configured to communicate with each other (e.g., through message passing) to carry out various tasks. Although two services 110A and 110N are illustrated for purposes of example, it is contemplated that any suitable number of services may be used with the service-oriented system 100. The services 110A-110N may represent different services (e.g., different sets of program code) or different instances of the same service. The services 110A-110N may be implemented using a plurality of hosts, any of which may be implemented by the example computing device 3000 illustrated in FIG. 13. The hosts may be located in any suitable number of data centers or geographical locations. In one embodiment, multiple services and/or instances of the same service may be implemented using the same host. It is contemplated that the service-oriented system 100 and/or traffic distribution mapping system 150 may include additional components not shown, fewer components than shown, or different combinations, configurations, or quantities of the components shown.

Using the techniques described herein, the traffic distribution mapping system 150 may determine what services or APIs were called by a particular service, directly or indirectly; what services or APIs called the particular service, directly or indirectly; and how often the calls were made. For example, over a period of time, a service A may call a service B 500 times, service B may call service C 100 times, and service C may call service D 1000 times. For service A, the mapping system 150 may determine a call ratio of A to B as 1:1, a call ratio of A to C as 5:1 (because A makes 500 calls to B for every 100 calls that B makes to C in the call path), and a call ratio of A to D as 1:2 (because A makes 500 calls to B for every 1000 calls that C makes to D in the call path). The mapping system 150 may account for the fact that separate requests from one service to the same API may not affect the same chain of calls, e.g., due to caching performed at some services. By utilizing trace data from services along with total call volume data from services, the mapping system 150 may accurately estimate the dependency call ratio and source-attributed call volume, and their standard errors, arising from calls to a service or API, for its direct and transitive (indirect) API dependencies. The call ratio and call volume may be determined for unique routes or call paths through the service-oriented system 100. In one embodiment, the mapping system 150 may aggregate trace statistics in strata according to the service or API where the trace started. In one embodiment, the mapping system 150 may aggregate trace statistics in strata according to the sampling model of the trace.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service. A service may offer one or more application programming interfaces (APIs) or other programmatic interfaces through which another service may request the functionality of the service. In one embodiment, the mapping system 150 may report a traffic distribution map 170 at the granularity of individual APIs of a service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 110A-110N may be configured with one or more components for monitoring interactions between services. For example, service 110A may include an interaction monitoring functionality 120A, and service 110N may include an interaction monitoring functionality 120N. The interaction monitoring functionality 120A through 120N may monitor or track interactions between the corresponding service 110A through 110N and other services (or components of services) in the service-oriented system 100. The monitored interactions may include service requests (i.e., requests for services to be performed), responses to requests, and other suitable events. In one embodiment, interactions may be sampled such that not every request is captured by the interaction monitoring. For example, a small percentage of interactions (e.g., one transaction per second per service instance) may be traced in order to reduce the overhead of tracing on the system 100. In various embodiments, various sampling strategies may be used to select interactions for monitoring. For example, any yet-untraced request may be randomly (or pseudo-randomly) sampled according to a sampling rate. As another example, any original request may be randomly (or pseudo-randomly) sampled according to a sampling rate, where an original request represents a request entering the system 100 from an external source such as a client-side web browser. In one embodiment, an original request may be identified based (at least in part) on a lack of a trace-related header associated with the request.

In one embodiment, the interaction monitoring functionality 120A through 120N may monitor service interactions in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service requests and responses, lightweight instrumentation may be added to services, including services 110A-110N. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A-120N are discussed below with respect to FIG. 7 through FIG. 12.

Based on the interaction monitoring, a service may collect sampled trace data and send the sampled trace data to the traffic distribution mapping system 150. For example, service 110A may collect and send sampled trace data 125A, and service 110N may collect and send sampled trace data 125N. The trace data may describe aspects of the service interactions. In one embodiment, the trace data may be generated in real-time or near real-time, e.g., as service requests and service responses are received and/or processed by the services. The trace data 125A-125N shown in FIG. 1 may represent the results of interaction monitoring 120A-120N over a particular period of time, e.g., one hour. The trace data may include data indicative of relationships between individual services, such as an identification of the calling (i.e., requesting) service and the called (i.e., requested) service for each interaction. The trace data may include data indicative of relationships between individual APIs, such as an identification of the calling (i.e., requesting) API and the called (i.e., requested) API for each interaction. The trace data may include metadata such as request identifiers that are usable to identify paths of service requests and responses from service to service. Request identifiers are discussed in greater detail below with respect to FIG. 7 through FIG. 12. The trace data may also include data describing the performance of the service interactions. For example, the trace data may include data indicative of network latency for a request or response, data indicative of network throughput for one or more interactions, data indicative of service reliability or availability, data indicative of resource usage, etc. The trace data generated for multiple services and multiple service interactions may be sent to the traffic distribution mapping system 150 for aggregation and analysis.

In one embodiment, each of the services 110A-110N may be configured with one or more components for monitoring call volumes at the services. For example, service 110A may include a call volume monitoring functionality 130A, and service 110N may include a call volume monitoring functionality 130N. The call volume monitoring functionality 130A through 130N may track the total number of interactions (e.g., requests to) the corresponding service over a particular period of time. Based on the call volume monitoring, a service may collect call volume data and send the call volume data to the traffic distribution mapping system 150. For example, service 110A may collect and send call volume data 135A, and service 110N may collect and send call volume data 135N. In one embodiment, the call volume data may be generated in real-time or near real-time, e.g., as service requests and service responses are received and/or processed by the services. In one embodiment, the call volume data may be sent to the mapping system 150 periodically, e.g., every minute or every ten minutes. The call volume data 135A-135N shown in FIG. 1 may represent the results of call volume monitoring 130A-130N over a particular period of time, e.g., one hour. In one embodiment, the call volume data at a particular service may represent the total call volume over a period of time and not a sampled call volume. As used herein, the term "total" as applied to a call volume indicates that the call volume data is not sampled. In one embodiment, the call volume data 135A-135N may be reported at the granularity of individual APIs.

In one embodiment, the traffic distribution mapping system 150 may include a plurality of components configured for tasks such as aggregation and analysis of the trace data 125A-125N and call volume data 135A-135N. For example, the traffic distribution mapping system 150 may include a data flow analysis functionality 160 that generates one or more call graphs or dependency graphs 165 representing a flow of requests between services 110A-110N over the particular period of time represented by the trace data 125A-125N. As another example, the traffic distribution mapping system 150 may perform aggregation of total call volume data 135 from various services in the service-oriented system 100, including total call volume data 135A-135N.

The interaction monitoring functionality 120A-120N for the various services may collect data indicative of service interactions involved in satisfying a particular initial request, e.g., data indicative of a route taken in satisfying a service request and/or a hierarchy of call pathways between services or their APIs. The route may correspond to a set of call paths between services or APIs. The call paths may represent inbound service requests and outbound service requests relative to a particular service or API. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call APIs of one or more other services. Additionally, each of those services may also call APIs of one or more other services, and so on until the root request is completely fulfilled. The particular services or APIs called to fulfill a request may be represented as a call graph that specifies, for each particular service or API of multiple services or APIs called to fulfill the same root request, the service or API that called the particular service or API and any services or APIs called by the particular service or API.

Using the data flow analysis functionality 1060, the traffic distribution mapping system 150 may analyze the trace data 125A-125N and generate one or more call graphs 165 based on connectivity information within the trace data. Each call graph may represent the flow of requests from service (or API) to service (or API) and may identify service dependencies. Each call graph may include a plurality of nodes representing services or APIs and one or more edges (also referred to as call paths) representing service interactions. Each of the call graphs 165 may include a hierarchical data structure that includes nodes representing the services and edges representing the interactions. In some cases, a call graph may be a deep and broad tree with multiple branches each representing a series of related service calls. The data flow analysis functionality 160 may use any suitable data and metadata to build each call graph, such as request identifiers and metadata associated with services and their interactions. The request identifiers and metadata are discussed below with respect to FIG. 7 through FIG. 12. In one embodiment, the data flow analysis functionality 100 may analyze the trace data 125A-125N and generate suitable reports and/or visualizations (e.g., call graph visualizations) based on the trace data.

The generation of a particular call graph may be initiated based on any suitable determination. In one embodiment, the call graph generation may be initiated in connection with the generation of a traffic distribution map 170 involving any of the services 110A-110N associated with the call graph(s) 165. In one embodiment, the call graph generation may be initiated after a sufficient period of time has elapsed with no further service interactions made for any relevant service. In one embodiment, heuristics or other suitable rule sets may be used to determine a timeout for a lack of activity to satisfy a particular root request. The timeout may vary based on the nature of the root request. For example, a root request to generate a web page using a hierarchy of services may be expected to be completed within seconds; accordingly, the call graph may be finalized within seconds or minutes.

Using the call graph(s) 165 and total call volume data 135, the traffic distribution mapping system 150 may determine a traffic distribution map 170. In one embodiment, the traffic distribution map 170 may be generated for a particular service in the service-oriented system 100. For example, a user or other component may ask the mapping system 150, via a user interface or application programming interface (API), to generate a traffic distribution map for a particular service and its upstream dependencies, its downstream dependencies, or both its upstream and downstream dependencies. In one embodiment, the map 170 may be generated once for a particular service, e.g., in response to user input. In one embodiment, the map 170 may be updated over time, e.g., periodically as new trace data and total call volume data are received by the mapping system 150. In various embodiments, the traffic distribution map 170 may include various elements. In one embodiment, the traffic distribution map 170 may include one or more call ratio(s) 171 between a particular service and one or more other services or APIs. In one embodiment, the traffic distribution map 170 may include a standard error 172 for the call ratio(s) 171. In one embodiment, the traffic distribution map 170 may include one or more call volume(s) 173 for a particular service as attributed to one or more other services or APIs. The call volume(s) 173 may be determined as a product of the call ratio(s) 171 and the total call volume data. In one embodiment, the traffic distribution map 170 may include a standard error 174 for the call volume(s) 173. The standard errors 172 and 174 may be calculated due to the effects of sampling, throttling, and/or data loss. The trace data may represent a stratified random sample, and the standard errors 172 and/or 174 may be calculated using a statistical methodology for a stratified random sample. In one embodiment, the map 170 may represent the call ratio(s) 171 and call volume(s) 173 at the granularity of individual APIs. In one embodiment, the map 170 may aggregate or roll up the API-level conclusions to the service level.

In one embodiment, the map 170 may be navigated using one or more APIs associated with the mapping system 150. The one or more mapping APIs may return reports in a structured format such as JSON. In one embodiment, an upstream API may report the estimated call ratio, call volume, and errors by any services (or APIs) that directly or indirectly call a common service (or API) dependency. In one embodiment, a downstream API may report the estimated call ratio, call volume, and errors for any service (or API) dependencies called directly or indirectly by a service (or API). In one embodiment, a time series API may report the time series of estimated call ratio, call volume, and errors for a service to service (or API to API) dependency pair. In one embodiment, a columnar database table schema with compound sort keys may be used to store periodic (e.g., hourly) service to service (or API to API) interaction counts and the sum of squared interaction counts, per trace origin service (or API), enabling efficient retrieval of the data for generation of custom reports over specified time periods.

Figure 13:
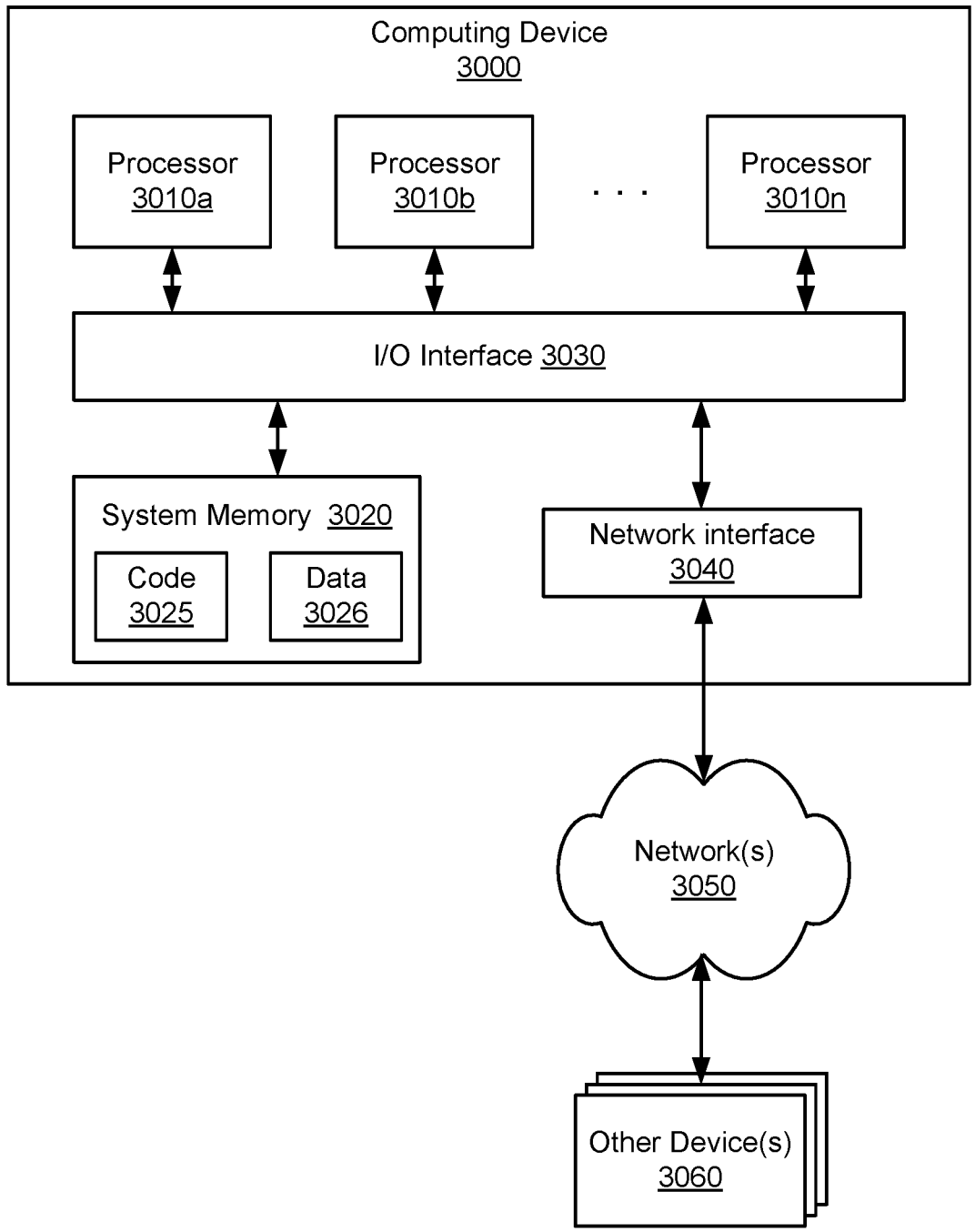
FIG. 13 illustrates an example of a computing device that may be used in some embodiments.

The traffic distribution mapping system 150 may include one or more computing devices, any of which may be implemented by the example computing device 3000 illustrated in FIG. 13. In various embodiments, the functionality of the different services, components, and/or modules of the traffic distribution mapping system 150 may be provided by the same computing device or by different computing devices. If any of the various components are implemented using different computing devices, then the respective computing devices may be communicatively coupled, e.g., via a network.

In one embodiment, aspects of the traffic distribution mapping system 150 may be performed automatically and/or programmatically, e.g., by executing program instructions without direct user intervention to determine the call graph(s), total call volume data 135, and/or traffic distribution map 170. In one embodiment, aspects of the traffic distribution mapping system 150 may be performed continuously and/or repeatedly to adapt to changing conditions in the service-oriented system 100. For example, the traffic distribution map for a particular service may be kept up to date based on the latest trace data and call volume data, e.g., by revising the traffic distribution map 170 periodically. In this manner, the traffic distribution map may be updated to capture the effects of demand changes in the service-oriented system 100. As another example, the traffic distribution map for a particular service may be updated when the program code for the service is updated. In one embodiment, the traffic distribution mapping system 150 may be included in a deployment pipeline for new software (including new versions of software) such that a traffic distribution map is determined based on the latest version of the program code. In one embodiment, automated calibration for hosts may also be included in the deployment pipeline. The frequency of host calibration (e.g., recalibration) may affect the accuracy of the traffic distribution. Additionally, the sampling rate and/or sampling strategy for trace data may affect the accuracy of the traffic distribution map.

In one embodiment, the traffic distribution mapping system 150 may analyze the performance data generated by the interaction monitoring functionality 120A-120N and received by the traffic distribution mapping system 150 in the trace data 125A-125N. The traffic distribution mapping system 150 may determine one or more performance metrics based on the trace data 125A-125N. In one embodiment, the performance metrics may describe aspects of the performance of multiple interactions, such as metrics representing aggregate performance, average performances, etc. In one embodiment, the performance metrics may describe aspects of the performance of individual interactions. For example, the traffic distribution mapping system 150 may calculate the client-measured latency for an interaction based on the time at which a request was sent by a service and also on the time at which a response to the request was received by the service. The traffic distribution mapping system 150 may also calculate the server-measured latency for an interaction based on the time at which a request was received by a service and also on the time at which a response to the request was sent by the service. The network transit time for the interaction may be calculated as the difference between the client-measured latency and the server-measured latency. Accordingly, the performance metrics may include individual transit times for individual service calls and/or transit time metrics (e.g., mean, median, etc.) for multiple service calls. Network transit times may be impacted by the number of network hops, the physical distance between hops, and the link quality between endpoints. In one embodiment, the performance metrics may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

Figure 2:
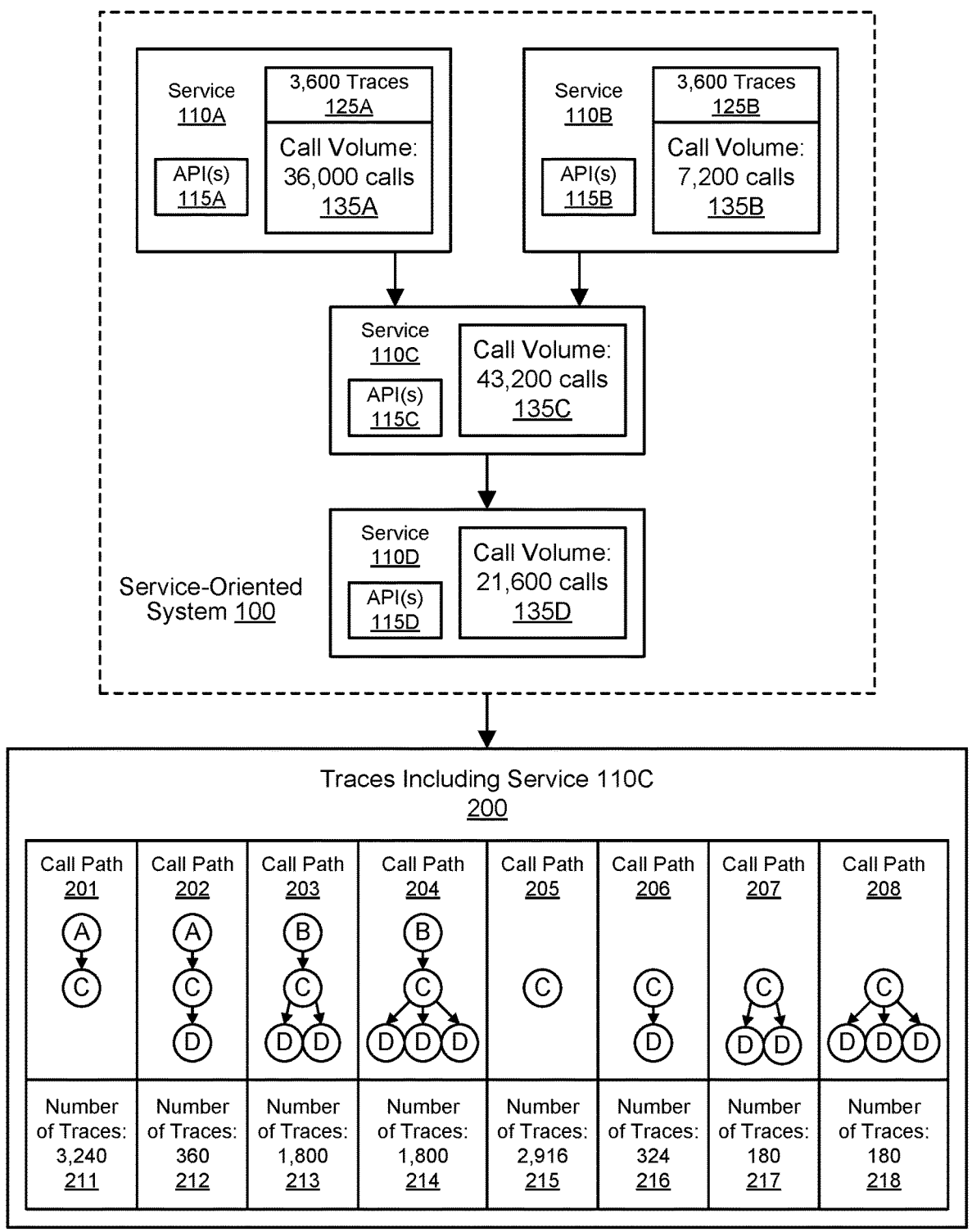
FIG. 2 illustrates an example of call volumes as determined using traffic distribution mapping in a service-oriented system, including estimated according to some embodiments.

FIG. 2 illustrates an example of call volumes as determined using traffic distribution mapping in a service-oriented system, including estimated according to some embodiments. As determined using trace data, the mapping system 150 may determine that the service-oriented system 100 includes a service 110A with one or more APIs 115A that calls one or more APIs 115C of a service 110C, a service 110B with one or more APIs 115B that also calls the API(s) 115C of the service 110C, and a service 110D with one or more APIs 115D that are called by service 110C. In the illustrated example, using the total call volume monitoring, the mapping system 150 may determine that service 110A has a total call volume 135A of 36,000 calls over a period of time (e.g., an hour); service 110B has a total call volume 135B of 7,200 over the period of time; service 110C has a total call volume 135C of 43,200 calls over the period of time; and service 110D has a total call volume 135D of 21,600 calls over the period of time. The total call volume 135C of 43,200 represents a sum of the total call volumes 135A and 135B, e.g., because all of the traffic at service 110C resulted from calls from services 110A and 110B. However, the total call volume 135D is half of the total call volume 135C, potentially because of caching performed at service 110C.

In the illustrated example, the mapping system 150 may determine a set of traces 200 that include the service 110C over a period of time. In one embodiment, the traces 200 may represent all of the unique call paths among the services 110A, 110B, 110C, and 110D (or their constituent APIs). Call path 201 may represent service 110A calling service 110C. Call path 202 may represent service 110A calling service 110C, and service 110C then calling service 110D. Call path 203 may represent service 110C calling service 110C, and service 110C then calling service 110D twice. Call path 204 may represent service 110C calling service 110C, and service 110C then calling service 110D three times. Call path 205 may represent service 110C by itself. Call path 206 may represent service 110C calling service 110D once. Call path 207 may represent service 110C calling service 110D twice. Call path 208 may represent service 110C calling service 110D three times. Although the example of FIG. 2 illustrates call paths between services, the trace data 200 may represent call paths from service to API or API to API.

In one embodiment, the mapping system 150 may determine the number of traces for the call paths 201-208 in the trace data. For call path 201, a number of traces 211 may be determined as 3,240 traces for the period of time. For call path 202, a number of traces 212 may be determined as 360 traces for the period of time. For call path 203, a number of traces 213 may be determined as 1,800 traces for the period of time. For call path 204, a number of traces 214 may be determined as 1,800 traces for the period of time.

In some cases, the number of traces may be derived based (at least in part) on assumptions about service 110C along with the number of traces collected for upstream services and the total call volumes at those services. For example, 3,600 traces 125A may be collected that involve service 110A, and another 3,600 traces 125B may be collected that involve service 110B. Based (at least in part) on the call volumes 135A, 135B, and 135C and the number of traces 125A and 125B, the mapping system 150 may conclude that of the 36,000 untraced calls at service 110C, 90% originate from service 110A and 10% originate from service 110B. For example, for call path 206, a number of traces 216 may be determined as 324 traces for the period of time: 3,600 traces involving service 110A*90%*0.1. For call path 205, a number of traces 215 may be determined as 2,916 traces for the period of time. For call path 207, a number of traces 217 may be determined as 180 traces for the period of time. For call path 208, a number of traces 218 may be determined as 180 traces for the period of time.

In one embodiment, a stratum may be identified by the root of one or more unique call paths. For the example shown in FIG. 2, call ratios may be determined per stratum as follows:

$$CallRatio_{C-D,A} = 1\frac{360}{3600} = 1/10$$

$$CallRatio_{C-D,B} = 2\frac{1800}{3600} + 3\frac{1800}{3600} = 5/2$$

$$CallRatio_{C-D,C} = 1\frac{324}{3600} + 2\frac{180}{3600} + 3\frac{180}{3600} = 17/50$$

In one embodiment, in order to determine call ratios, weights may be determined per stratum based on the number of traces for the stratum divided by the total call volume at service 110C:

$$W_A = \frac{3600}{43,200} = 1/12$$

$$W_B = \frac{3600}{43,200} = 1/12$$

$$W_C = 1 - W_A - W_B = 5/6$$

Figure 3:
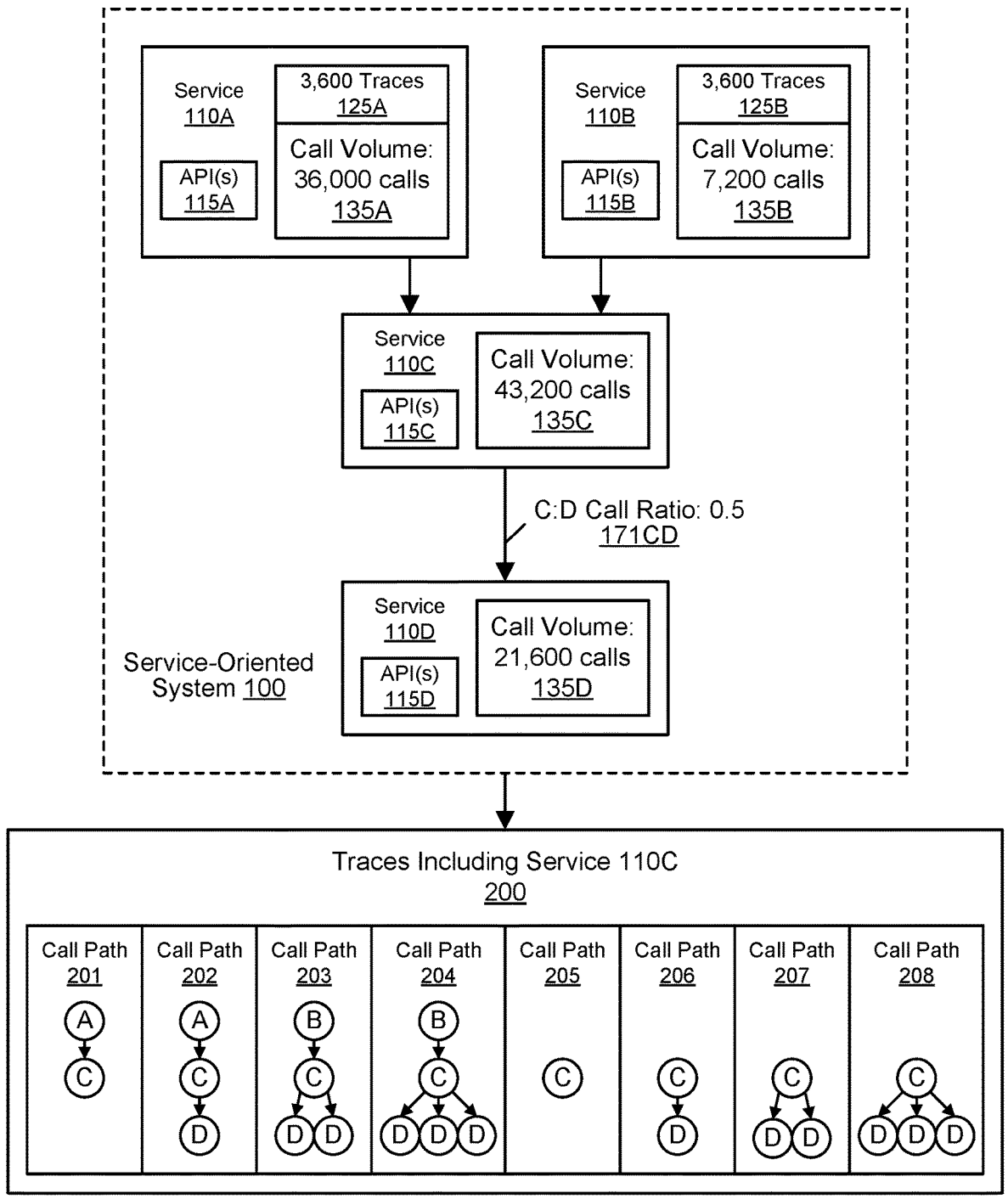
FIG. 3 illustrates an example of estimated call ratios as determined using traffic distribution mapping in a service-oriented system, including estimated according to some embodiments.

FIG. 3 illustrates an example of estimated call ratios as determined using traffic distribution mapping in a service-oriented system, including estimated according to some embodiments. In one embodiment, call ratios may be determined using one or more of the stratum weights. The call volume between two services or APIs may then be determined as the product of the call ratio and the total call volume. For example, the call ratio 171CD of service 110C to service 110D may be determined as follows:

$$CallRatio_{C-D} = \Sigma_i W_i \, CallRatio_{C-D,i} = 0.5$$

In one embodiment, the call ratio variance per stratum may be determined as follows:

$$s^2 = \frac{1}{n-1}\sum_{i=1}^{n}(x_i - \bar{x})^2 = \frac{1}{n-1}\sum_{i=1}^{n}(x_i^2 - n\bar{x}^2)$$

$$s^2_{C-D,A} = \frac{1}{3599}\left(360 - 3600\left(\frac{1}{10}\right)^2\right) = 324/3599$$

$$s^2_{C-D,B} = \frac{1}{3599}\left((1800)2^2 + (1800)3^2 - 3600\left(\frac{5}{2}\right)^2\right) = \frac{900}{3599}$$

$$s^2_{C-D,C} = \frac{1}{3599}\left(324 + (180)2^2 + (180)3^2 - 3600\left(\frac{17}{50}\right)^2\right) = \frac{56196}{89975}$$

In one embodiment, a finite population correction factor per stratum may be determined as follows, e.g., in order to account for the limitations of sampling:

$$fpc_{C,A} = 1 - \frac{3600}{3600} = 0$$

$$fpc_{C,B} = 1 - \frac{3600}{3600} = 0$$

$$fpc_{C,C} = 1 - \frac{3600}{36000} = 9/10$$

In one embodiment, the standard error for a call ratio may then be determined as follows:

$$CallRatioError_{C-D} = \sqrt{\sum_i W_i^2 \, fpc_{C,i}\left(\frac{s^2_{C-D,i}}{n_i}\right)}$$

$$CallRatioError_{C-D} = \sqrt{\left(\frac{5}{6}\right)^2\left(\frac{9}{10}\right)\left(\frac{1}{3600}\right)\left(\frac{56196}{89975}\right)} = 0.01041311183$$

Figure 4:
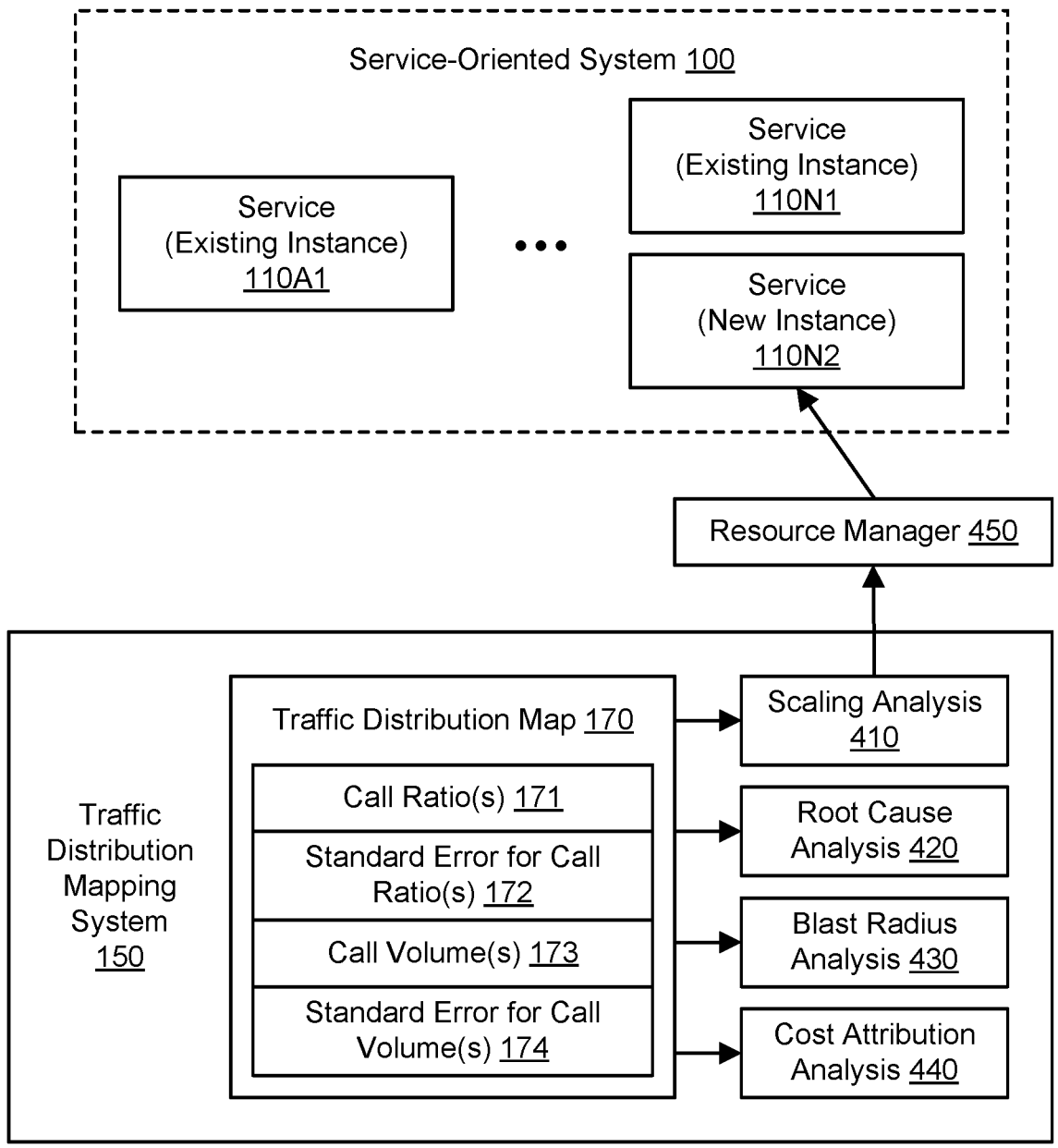
FIG. 4 illustrates further aspects of the example system environment for traffic distribution mapping in a service-oriented system, including scaling and additional analysis using a traffic distribution map, according to some embodiments.

FIG. 4 illustrates further aspects of the example system environment for traffic distribution mapping in a service-oriented system, including scaling and additional analysis using a traffic distribution map, according to some embodiments. In various embodiments, the mapping system 150 may perform or enable various forms of analysis based (at least in part) on a traffic distribution map 170. In one embodiment, the analysis may be performed using automated techniques, e.g., to generate reports outlining recommendations or identifying problems for system administrators. In one embodiment, the analysis may be performed manually using a traffic distribution map 170 as reported to a system administrator in a user interface. In one embodiment, the analysis may include scaling analysis 410 that analyzes a traffic distribution map and determines whether a particular service should be scaled up or down. In one embodiment, the analysis may include root cause analysis 420 that identifies one or more services or APIs as the root cause of a performance problem in the service-oriented system, e.g., a high latency for requested tasks, an excessive number of dropped requests or errors, and so on. In one embodiment, the analysis may include blast radius analysis 430 that determines the impact of an outage at a particular service or API, e.g., on other services that tend to be in its call paths. In one embodiment, the analysis may include cost attribution analysis 440 that determines a cost attributed to one service or API for tasks performed by another service or API.

Based (at least in part) on the scaling analysis 410, one or more services may be scaled manually or automatically. Scaling of a service may include increasing the number of instances (or nodes) that implement the service, decreasing the number of instances that implement the service, modifying the locations of service instances, and so on. For example, as shown in FIG. 4, an additional instance 110N2 of service 110N may be added to the service-oriented system 100 to operate concurrently with an existing instance 110N1. However, the number of instances of service 110A, including instance 110A1, may be unaltered based (at least in part) on the scaling analysis 410. Scaling may affect the performance of the service-oriented system 100. For example, the addition of the new service instance 110N2 may reduce the number of requests handled by the existing instance 110N1 and thus improve the availability of the instance 110N1 and reduce the latency of its processing of requests. Conversely, if the scaling analysis 410 indicates that a service is underutilized relative to its number of instances, then the number of instances may be reduced to achieve less waste in computing resources. In one embodiment, based (at least in part) on scaling analysis 410, the service-oriented system 100 may be optimized over time to adapt to changing conditions.

In one embodiment, at least a portion of the set of computing resources for a particular service may be automatically allocated from a pool of computing resources. The pool of computing resources may be managed by a resource manager 450 associated with the service-oriented system 100. The pool may represent a plurality of computing resources which are available to various services in a service-oriented system 100, including the particular service. The pool may include a plurality of computing resources such as virtual compute instances that may be heterogeneous or homogeneous in their hardware capabilities and software configuration. The computing resources in the pool may be usable to provide or otherwise implement one or more services.

In one embodiment, the resource manager 450 may manage a multi-tenant provider network that includes the computing resources used for scaling of services. The provider network may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. In one embodiment, an operator of the provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. Using such an interface, the scaling analysis 410 may allocate various computing resources to services for a period of time.

Figure 5:
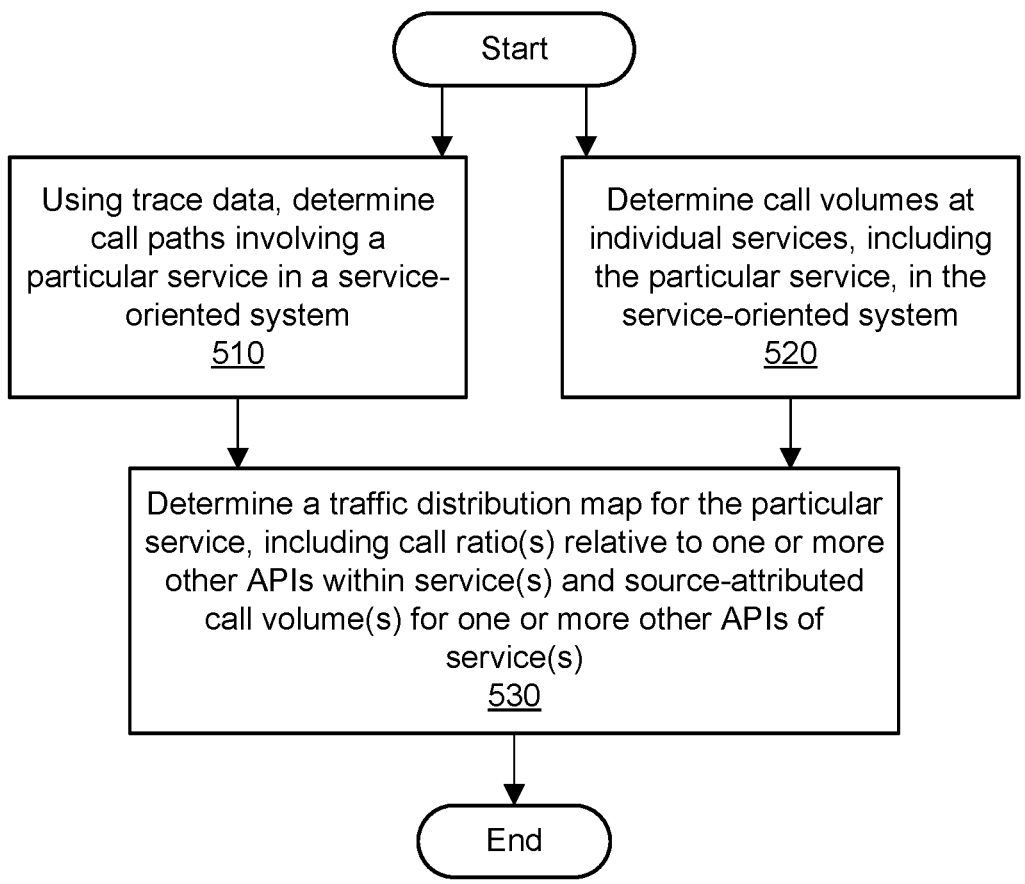
FIG. 5 is a flowchart illustrating a method for traffic distribution mapping in a service-oriented system, according to some embodiments.

FIG. 5 is a flowchart illustrating a method for traffic distribution mapping in a service-oriented system, according to some embodiments. As shown in 510, using trace data, one or more call paths involving a particular service may be determined. The trace data may be collected by individual services in a service-oriented system and reported to a centralized component such as a traffic distribution mapping system. In one embodiment, the trace data may be collected by sampling of interactions, such that not every interaction between services contributes directly to the trace data. For example, one transaction per second may be sampled at a particular service node. The trace data may be used to build a dependency graph that shows dependency relationships between individual services or individual APIs, such that a first service that calls a second service is said to depend on the second service. The dependency graph may include the one or more call paths involving the particular service. The operation shown in 510 may focus on the particular service based (at least in part) on invocation of a mapping API, e.g., by a user through a user interface, that identifies the particular service as the subject of inquiry. In one embodiment, an upstream API may determine and report the estimated call ratio, call volume, and errors by any services (or APIs) that directly or indirectly call a common service (or API) dependency. In one embodiment, a downstream API may determine and report the estimated call ratio, call volume, and errors for any service (or API) dependencies called directly or indirectly by a service (or API). In one embodiment, a time series API may determine and report the time series of estimated call ratio, call volume, and errors for a service to service (or API to API) dependency pair. The call paths identified in 510 may be observed over a particular period of time, e.g., one hour. The time period may be specified by the user along with the identity of the service being analyzed.

As shown in 520, call volumes may be determined at individual services including the particular service. The call volumes may represent total (not sampled) volumes of calls at particular services over a period of time, e.g., the same period reflected in the trace data. Calls may represent unique requests and/or responses. The call volume data may be reported at the granularity of individual APIs. The call volume data may be collected through instrumentation of services and reported to a centralized component such as a traffic distribution mapping system. The operation shown in 520 may be performed concurrently with the operation shown in 510.

As shown in 530, a traffic distribution map may be determined for the particular service. The map may relate to the same time period as the trace data and the call volume data. The traffic distribution map may reflect both direct and indirect (e.g., further downstream or upstream) dependency relationships. The map may include one or more conclusions or estimates about traffic distribution associated with the particular service. In one embodiment, the map may include one or more call ratios involving the particular service. A call ratio may represent the average number of calls to a dependency entity (an upstream or downstream service or API) per single call to the particular service. In one embodiment, the map may include one or more call volumes involving the particular service. A call volume may represent the number of calls to a dependency entity (a service or API) due to calls from the particular service. In one embodiment, a call volume with respect to a dependency entity may be determined as a function of a call volume reported by the subject service or dependency entity and the derived call ratio. A total call volume may represent the total number of calls to a dependency entity. In some embodiments, the map may also include a standard error of the call ratio and/or a standard error of the source-attributed call volume.

Figure 6:
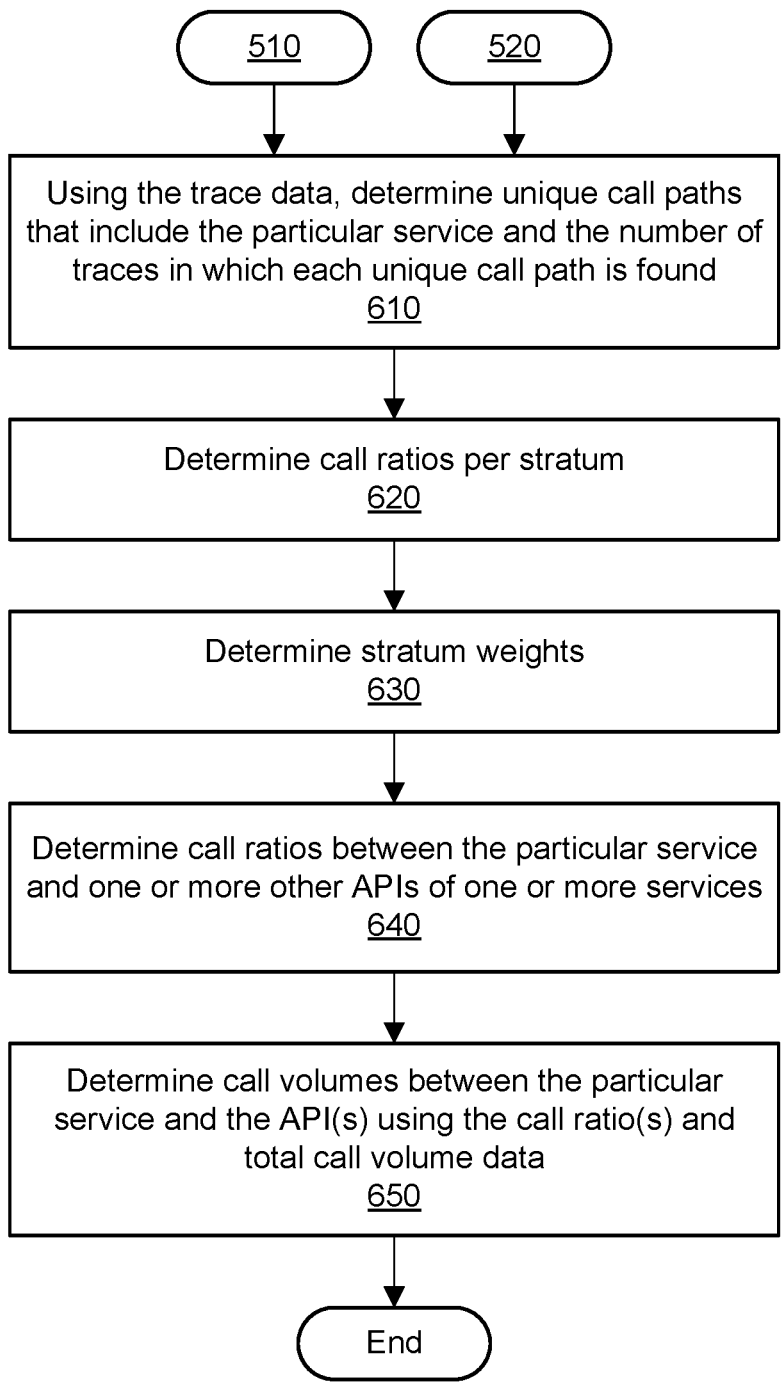
FIG. 6 is a flowchart illustrating further aspects of the method for traffic distribution mapping in a service-oriented system, according to some embodiments.

FIG. 6 is a flowchart illustrating further aspects of the method for traffic distribution mapping in a service-oriented system, according to some embodiments. The operations shown in FIG. 6 may represent internal operations of the operation shown above in 530. As shown in 610, a set of unique call paths may be determined that involve the particular service. The call paths may be identified through analysis of trace data for interactions sampled by individual services. The call paths may represent unique call paths. The number of traces including particular call paths may be determined. The number of traces may be determined using trace data and total call volume data.

As shown in 620, call ratios per stratum may be determined. Unique call paths may be grouped by stratum, and a stratum may be identified by the root node of its traces. In one embodiment, to determine a call ratio per stratum, each trace node tree may be traversed to sum up the subject-dependency interactions, direct interactions, and sum of squared interactions per trace root. The sum of squared interactions may be used to calculate the variance. As shown in 630, stratum weights may be determined, e.g., by dividing the stratum size in terms of traces by the population size in terms of total call volume at the subject service. The stratum size may represent the number of interactions at a subject service due to traces from a particular root. The stratum size may include yet untraced requests. As shown in 640, the call ratios between the particular service and other dependency entities (upstream or downstream services or APIs, with a direct relationship or an indirect relationship) may be determined. The call ratios may be determined using the stratum weights and the call ratios per stratum. For example, the call ratios may be determined by summing the stratum call ratios and sample variances for each subject-dependency relationship using the population weights with finite population correction factors. In one embodiment, the standard error of the call ratio may also be determined using statistical methodology associated with stratified random samples. As shown in 650, call volumes between the particular service and the other dependency entities may be determined, e.g., as a product of the call ratios and total call volumes.

Tracking Service Requests

As discussed above with respect to FIG. 1, the mapping system 150 may generate one or more call graphs 165 based on trace data originating from the service-oriented system 100. For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. A request to a service may represent a request to an API of that service. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 7:
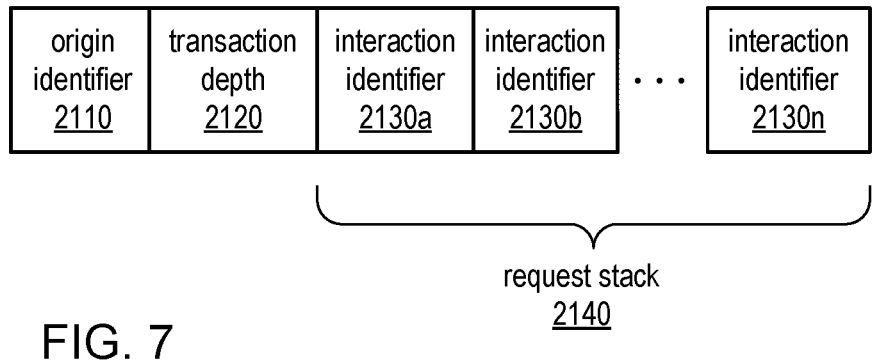
FIG. 7 illustrates an example format of a request identifier, according to some embodiments.

FIG. 7 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 7. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lowercase alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the sheer number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130a-2130n may represent a series of interaction identifiers in ascending chronological order (where interaction identifier 2130a corresponds to the oldest service call and interaction identifier 2130*n* corresponds to the most recent service call).

In addition to the illustrated elements, request identifier 2100 may in various embodiments include one or more portions of data for error detection and/or error correction. Examples of such data include but are not limited to various types of checksums.

Figure 8:
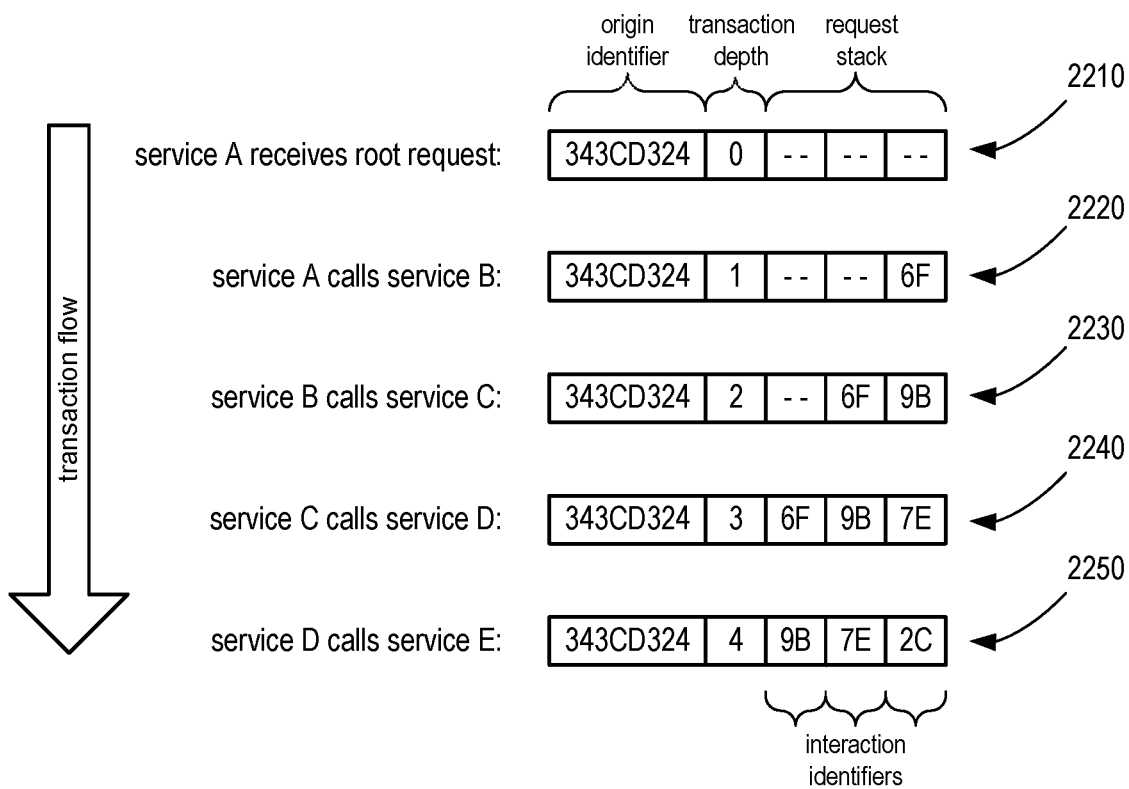
FIG. 8 illustrates an example transaction flow for fulfilling a root request, according to some embodiments.

FIG. 8 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 9). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 9:
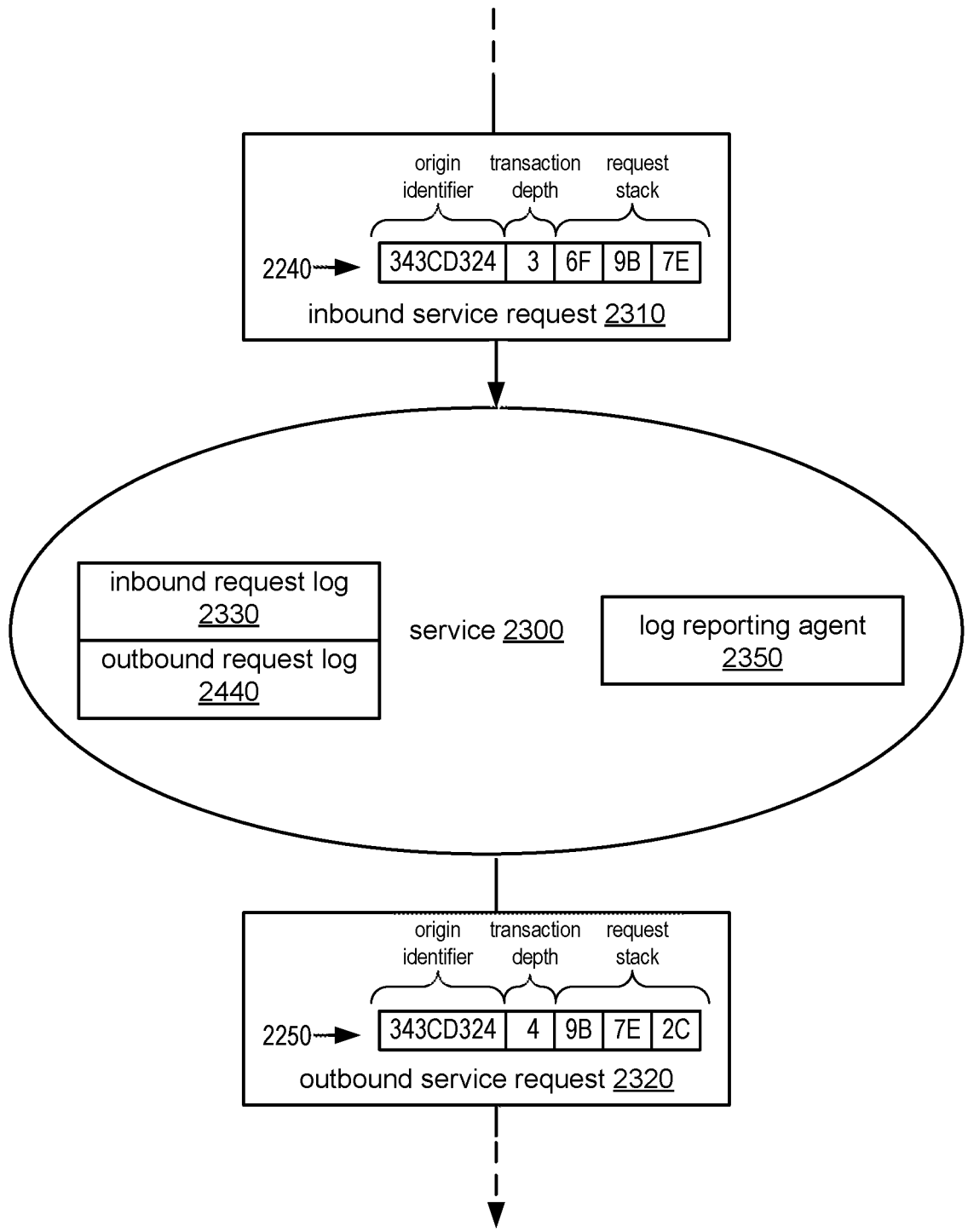
FIG. 9 illustrates one example of a service of a service-oriented system, according to some embodiments.

Referring collectively to FIG. 8 and FIG. 9, a representation of the receipt of an inbound service request (or service call) 2310 as well as the issuance of an outbound request 2320 by service 2300 is illustrated. Request identifiers 2240 and 2250 of FIG. 9 may correspond to the like-numbered elements of FIG. 8. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 8. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 10:
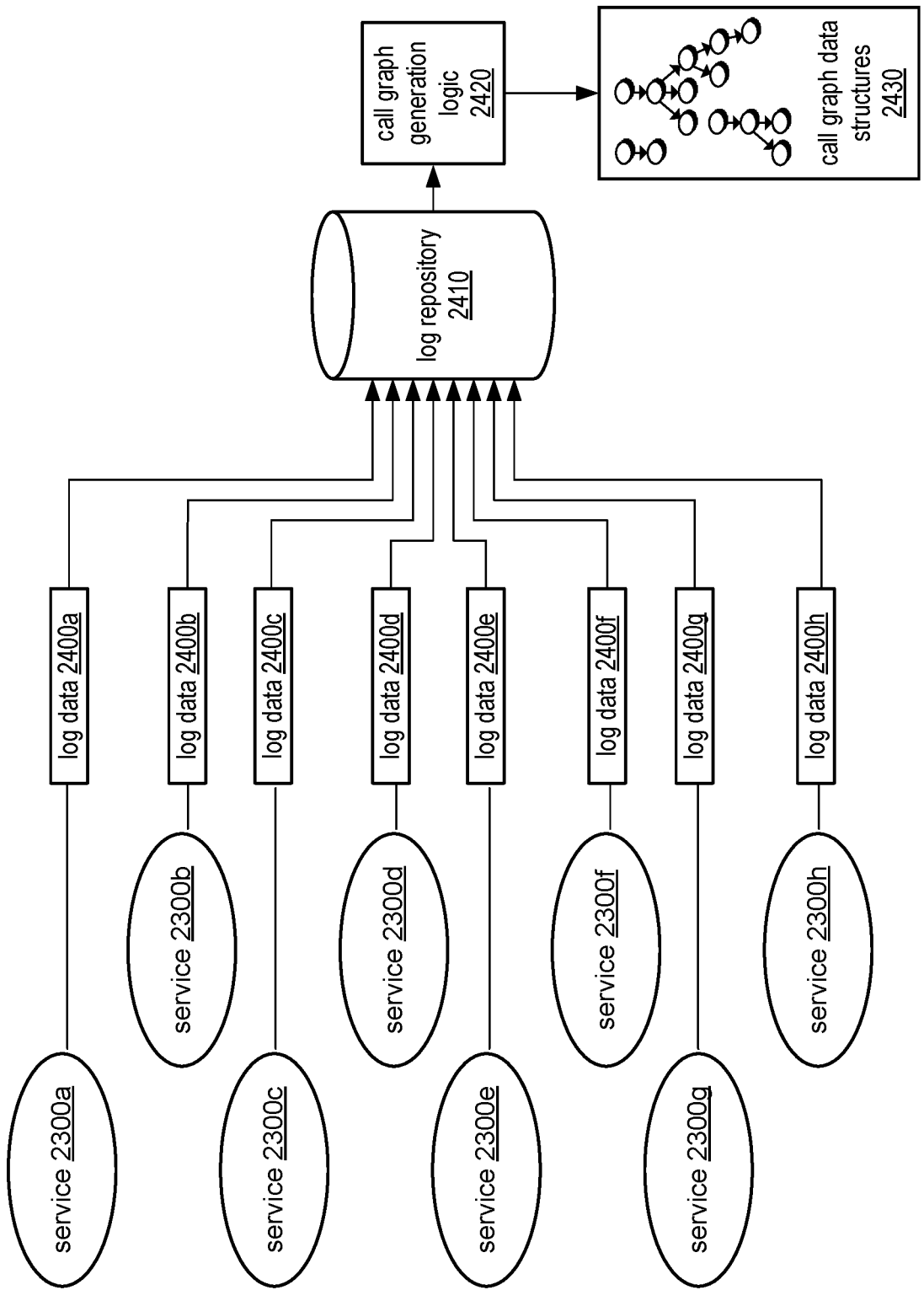
FIG. 10 illustrates an example data flow diagram for the collection of log data and generation of a call graph, according to some embodiments.

Referring collectively to FIG. 9 and FIG. 10, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 10. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 10, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 11:
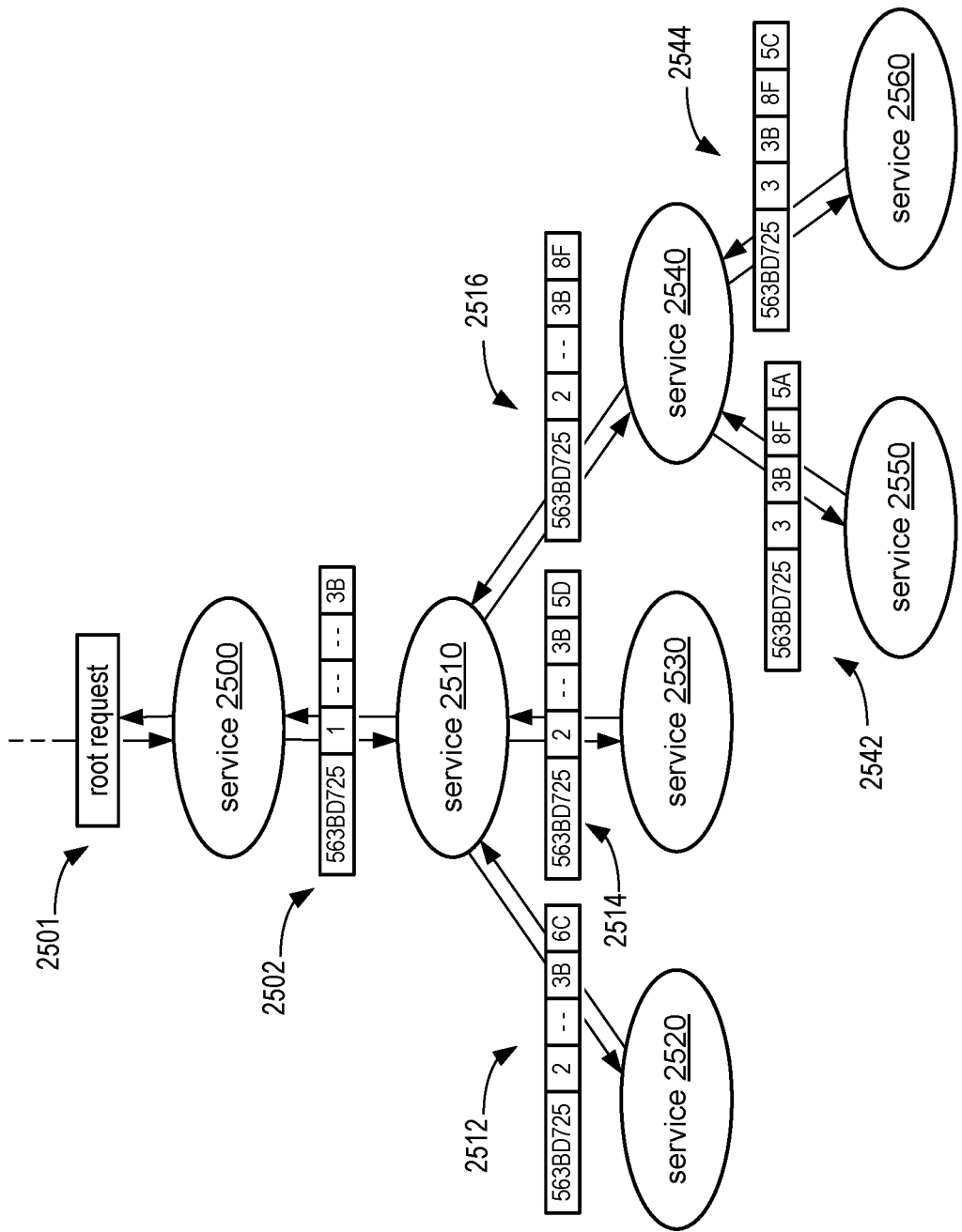
FIG. 11 illustrates an example visual representation of a call graph and request identifiers from which such call graph is generated, according to some embodiments.

FIG. 11 illustrates a visual representation of such a call graph data structure that may be generated by call graph generation logic 2420. In various embodiments, a call graph data structure may include any data structure that specifies, for a given root request, all the services called to fulfill that root request. Note that while FIG. 11 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 11 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 7. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 11 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 9 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 9, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 9, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 9.

In various embodiments, the call graph generation logic may also generate the new depth value such that the new depth value is a result of incrementing the first depth value. For example, in the illustrated embodiment of FIG. 9, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 9, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 7.

Figure 12:
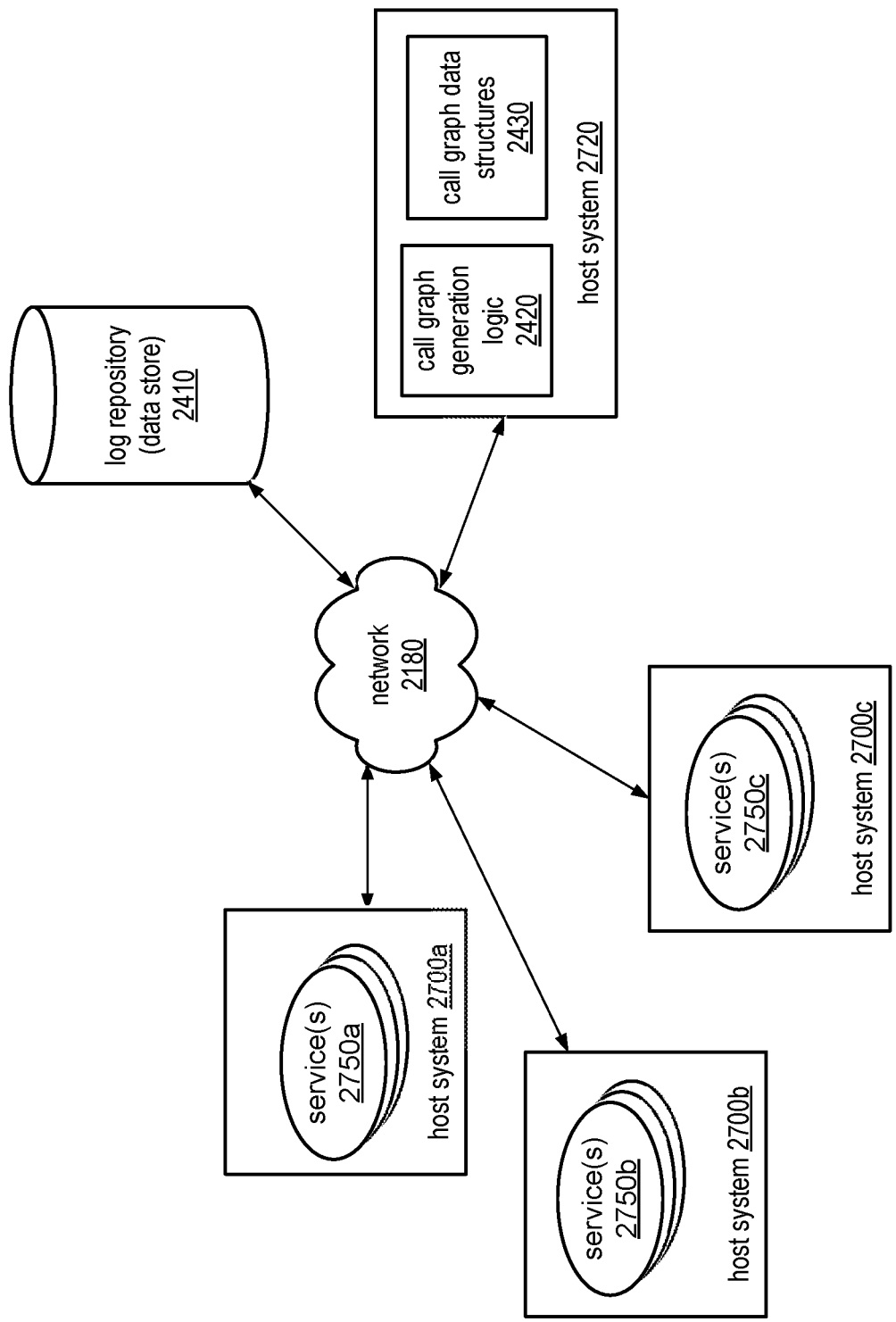
FIG. 12 illustrates an example system configuration for tracking service requests, according to some embodiments.

One example system configuration for tracking service requests is illustrated in FIG. 12. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700*a-c* and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700*a* may be configured to execute program instruction to implement one or more services 2750*a*. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700*b-c* and services 2750*b-c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 13 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. When used in the claims, the term "or" is used as an inclusive or and not as an exclusive or. For example, the phrase "at least one of x, y, or z" means any one of x, y, and z, as well as any combination thereof.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement a traffic distribution mapping system and a service-oriented system, wherein the service-oriented system comprises a plurality of services including a particular service and one or more additional services, wherein the services comprise application programming interfaces (APIs), and wherein the traffic distribution mapping system is configured to:
determine a plurality of call paths representing service interactions among the plurality of services over a period of time, wherein the plurality of call paths include the particular service, and wherein the plurality of call paths are determined based on tracing a sampling of service calls among the plurality of services;
determine numbers of traced samples over the period of time for individual ones of the call paths;
determine total call volumes at individual ones of the services over the period of time;
determine, based at least in part on the numbers of traced samples for individual ones of the call paths and the total call volumes at individual ones of the services, one or more estimated call ratios between the particular service and one or more APIs of one or more of the additional services over the period of time; and
determine, based at least in part on the one or more estimated call ratios and the total call volumes, one or more call volumes between the particular service and one or more APIs of one or more of the additional services over the period of time.

2. The system as recited in claim 1, wherein the traffic distribution mapping system is further configured to:
determine a standard error of the one or more estimated call ratios; and
determine a standard error of the one or more call volumes.

3. The system as recited in claim 1, wherein a number of instances of one of the services is increased or decreased responsive to the one or more estimated call ratios and the one or more call volumes.

4. The system as recited in claim 1, wherein the traffic distribution mapping system is further configured to:
determine, based at least in part on the one or more estimated call ratios and the one or more call volumes, an impact of a service outage on the services.

5. A computer-implemented method, comprising:
determining a plurality of call paths representing service interactions among a plurality of services over a period of time, wherein the plurality of call paths include a particular service, and wherein the plurality of call paths are determined based on tracing a sampling of service calls among the plurality of services;
determining numbers of traced samples for individual ones of the call paths;
determining total call volumes at individual ones of the services; and
determining, based at least in part on the numbers of traced samples for individual ones of the call paths and the total call volumes at individual ones of the services, one or more estimated call ratios associated with the particular service and one or more additional services.

6. The method as recited in claim 5, further comprising: determining a standard error of the one or more call ratios.

7. The method as recited in claim 5, further comprising: determining, based at least in part on the one or more call ratios and the total call volumes, one or more call volumes associated with the particular service and the one or more additional services.

8. The method as recited in claim 7, further comprising: determining a standard error of the one or more call volumes.

9. The method as recited in claim 5, further comprising: modifying a number of instances of one of the services responsive to the one or more call ratios.

10. The method as recited in claim 5, further comprising: determining, based at least in part on the one or more call ratios, an impact of a service outage on the services.

11. The method as recited in claim 5, further comprising: determining, based at least in part on the one or more call ratios, a root cause of a performance problem among the services.

12. The method as recited in claim 5, wherein the sampling is performed based on a pseudo-random selection of the service calls.

13. One or more non-transitory computer-readable storage media storing program instructions that, when executed on or across one or more processors, perform:
determining a plurality of call paths representing service interactions among a plurality of services over a period of time, wherein the services comprise application programming interfaces (APIs), wherein the plurality of call paths include a particular service, and wherein the plurality of call paths are determined based on tracing a sampling of service calls among the plurality of services;
determining numbers of traced samples for individual ones of the call paths;
determining total call volumes at individual ones of the services; and
determining, based at least in part on the numbers of traced samples for individual ones of the call paths and the total call volumes at individual ones of the services, one or more estimated call volumes associated with the particular service and one or more APIs of one or more additional services.

14. The one or more non-transitory computer-readable storage media as recited in claim 13, wherein the program instructions, when executed on or across the one or more processors, perform:
determining a standard error of the one or more call volumes.

15. The one or more non-transitory computer-readable storage media as recited in claim 13, wherein the program instructions, when executed on or across the one or more processors, perform:
determining, based at least in part on the call paths and the total call volumes, one or more call ratios associated with the particular service and one or more APIs of the one or more additional services, wherein the one or more call volumes are determined based at least in part on the one or more call ratios.

16. The one or more non-transitory computer-readable storage media as recited in claim 15, wherein the program instructions, when executed on or across the one or more processors, perform:
determining a standard error of the one or more call ratios.

17. The one or more non-transitory computer-readable storage media as recited in claim 13, wherein the program instructions, when executed on or across the one or more processors, perform:
modifying a number of instances of one of the services responsive to the one or more call volumes.

18. The one or more non-transitory computer-readable storage media as recited in claim 13, wherein the one or more additional services are upstream from the particular service in the call paths.

19. The one or more non-transitory computer-readable storage media as recited in claim 13, wherein the one or more additional services are downstream from the particular service in the call paths.

20. The one or more non-transitory computer-readable storage media as recited in claim 13, wherein the sampling is performed based on a pseudo-random selection of the service calls.

* * * * *